(12) United States Patent
Suzuki

(10) Patent No.: US 7,695,142 B2
(45) Date of Patent: Apr. 13, 2010

(54) PROJECTOR HAVING A METAL PLATE BETWEEN A BOTTOM SURFACE OF A PROJECTOR MAIN BODY AND A LAMP UNIT

(75) Inventor: Masakazu Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 609 days.

(21) Appl. No.: 11/727,720

(22) Filed: Mar. 28, 2007

(65) Prior Publication Data

US 2007/0229776 A1  Oct. 4, 2007

(30) Foreign Application Priority Data

Mar. 31, 2006  (JP) .............................. 2006-098993

(51) Int. Cl.
   *G03B 21/16* (2006.01)
(52) U.S. Cl. ........................................ 353/52; 353/119
(58) Field of Classification Search ................ 250/239, 250/238, 216; 353/51–61, 119; 362/6, 16
   See application file for complete search history.

(56) References Cited

U.S. PATENT DOCUMENTS 3,761,170 A * 9/1973 Genesky et al. ............... 353/87

| | | | |
|---|---|---|---|
| 2002/0021415 A1 | 2/2002 | Fujimori et al. |
| 2004/0228130 A1 | 11/2004 | Kato et al. |
| 2004/0239897 A1 | 12/2004 | Ogawa et al. |
| 2006/0001844 A1 | 1/2006 | Fukuda et al. |

FOREIGN PATENT DOCUMENTS

| EP | 1195640 A1 | 4/2002 |
|---|---|---|
| JP | A 2002-244210 | 8/2002 |

* cited by examiner

*Primary Examiner*—Que T Le
(74) *Attorney, Agent, or Firm*—Pillsbury Winthrop Shaw Pittman, LLP

(57) ABSTRACT

This projector includes a lamp unit including a lamp which emits light for projecting an image upon a screen. This lamp unit is provided with a projector main body. Moreover, the projector includes a metal plate which is disposed, between a bottom surface of the projector main body and the lamp unit, in a situation of floating away from this bottom surface of the projector main body. The projector also includes a fan which sucks external air into the projector main body. This fan is disposed in an orientation such as to blow this sucked in external air towards the metal plate.

3 Claims, 6 Drawing Sheets

PROJECTOR HAVING A METAL PLATE BETWEEN A BOTTOM SURFACE OF A PROJECTOR MAIN BODY AND A LAMP UNIT

CROSS REFERENCE

This Nonprovisional application claims priority under 35 U.S.C. §119(a) on Patent Application No. 2006-098993 filed in Japan on Mar. 31, 2006, the entire contents of which are hereby incorporated by reference.

BACKGROUND OF THE INVENTION

The present invention relates to a projector equipped with a lamp unit which has a lamp for image projection.

In the prior art, a projector is per se known which emits light from a lamp onto a image display device, thus projecting a image displayed by this image display device upon a screen.

Such a projector includes a lamp unit which contains a lamp for image projection, a projector main body (a device main body) which contains the lamp unit, and a projection lens which projects the light emitted from the lamp unit to the exterior of the projector main body.

On the other hand, a projector has been proposed as described in Japanese Laid-Open Patent Publication 2002-244210.

However, with such prior art projectors, the lamp unit reaches an extremely high temperature due to emission of heat by the lamp. Due to this, the projector main body is subjected to thermal load by this heat emission. In particular, the thermal load upon the projector main body around the lamp unit is high.

Accordingly, the problem has arisen that the projector main body has difficulty in withstanding this thermal load, and may soften. Furthermore, there has been the problem that, in the worst case, the projector main body melts.

Moreover, the projector described in Japanese Laid-Open Patent Publication 2002-244210 is equipped with a cooling device which cools the lamp. However, this cooling is in order to keep the temperature of the lamp constant. Due to this, with this projector disclosed in this Japanese Laid-Open Patent Publication 2002-244210, the fact that the temperature of the lamp becomes high still does not change. Accordingly, with this projector disclosed in Japanese Laid-Open Patent Publication 2002-244210 as well, due to dissipation of heat from the lamp, sometimes softening or melting of the projector main body may take place, centered around the portion thereof which faces the lamp in the projector main body.

The objective of the present invention is to provide a projector with which softening or melting of the projector main body, due to emission of heat by the lamp, is prevented.

SUMMARY OF THE INVENTION

The projector according to the present invention projects an image upon a screen by using light which is emitted from a lamp unit including a lamp, which constitutes a light source. This lamp unit is provided within a projector main body. With this structure, due to thermal emission from the lamp, the lamp unit attains an extremely high temperature.

Accordingly, this projector includes a metal plate which is disposed, between a bottom surface of the projector main body and the lamp unit, in a situation of floating away from this bottom surface of the projector main body. With this structure, the metal plate intercepts the heat emitted from the lamp unit. In other words, the metal plate prevents the heat which is emitted from the lamp unit from reaching the projector main body. Now, if the metal plate and the projector main body were to come into mutual contact, then the projector main body would be heated up from this contact spot. Because of this, the metal plate is fitted in a situation of floating away from the bottom surface of the projector main body. In other words, the metal plate is provided with a certain gap being opened up between itself and the bottom surface of the projector main body.

Furthermore, the projector includes a fan which sucks external air into the projector main body. And this fan is disposed in an orientation such as to blow this sucked in external air towards the metal plate. With this structure, the air which is sucked in by the fan is able to enter into the gap between the metal plate and the projector main body bottom surface, since it is blown by the fan. And this air flowing through the gap cools down both the metal plate and the bottom surface of the projector main body.

DETAILED DESCRIPTION OF THE INVENTION

In the following various projectors which are embodiments of the present invention will be described.

Figure 1:
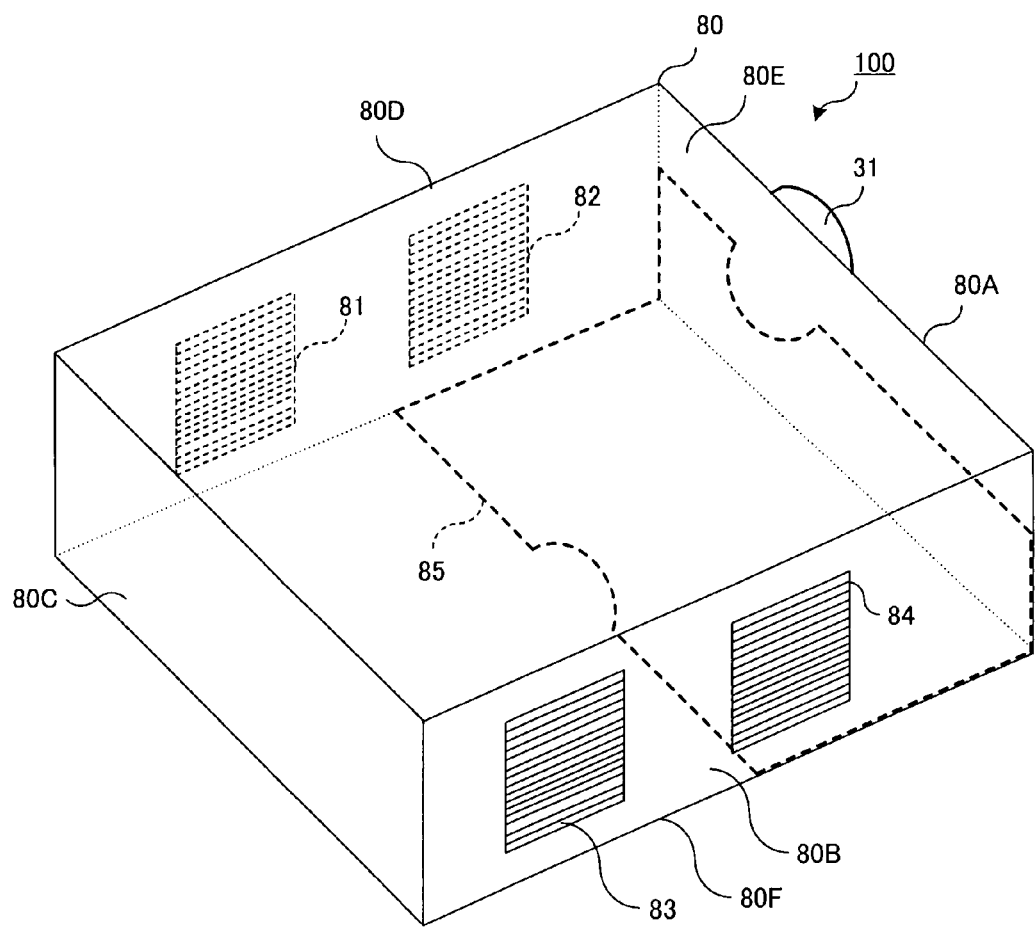
FIG. 1 is an external perspective view showing a projector according to an embodiment of the present invention.

FIG. 1 is an external perspective view showing a projector which is an embodiment of the present invention. A projector main body (chassis) 80 of this projector 100 comprises side plates 80A through 80D, a top plate 80E, and a bottom plate 80F. Furthermore, portions of the side plate 80A and the bottom plate 80F constitute a lamp door 85 which can be fitted to and removed and from the projector main body 80. By removing this lamp door 85 from the projector main body 80, the user is able to perform the task of exchange or the like of a lamp unit 10 (described hereinafter with reference to FIG. 2) in a simple manner. A projection lens 31 is fitted to the side plate 80A. This projection lens 31 projects light to the exterior of the projector main body 80. Intake apertures 81 and 82 are formed in the side plate 80D. These intake apertures 81 and 82 are for intake of external air into the interior of the projector main body 80. And exhaust apertures 83 and 84 are formed in the side plate 80B. These exhaust apertures 83 and 84 are for exhausting air from the interior of the projector main body 80.

It should be understood that, from the aspect of formability, the material which is used for the projector main body 80 is a synthetic thermoplastic resin.

The lamp door 85 and the projector main body 80 correspond to the "projector main body" of the Claims.

Figure 2:
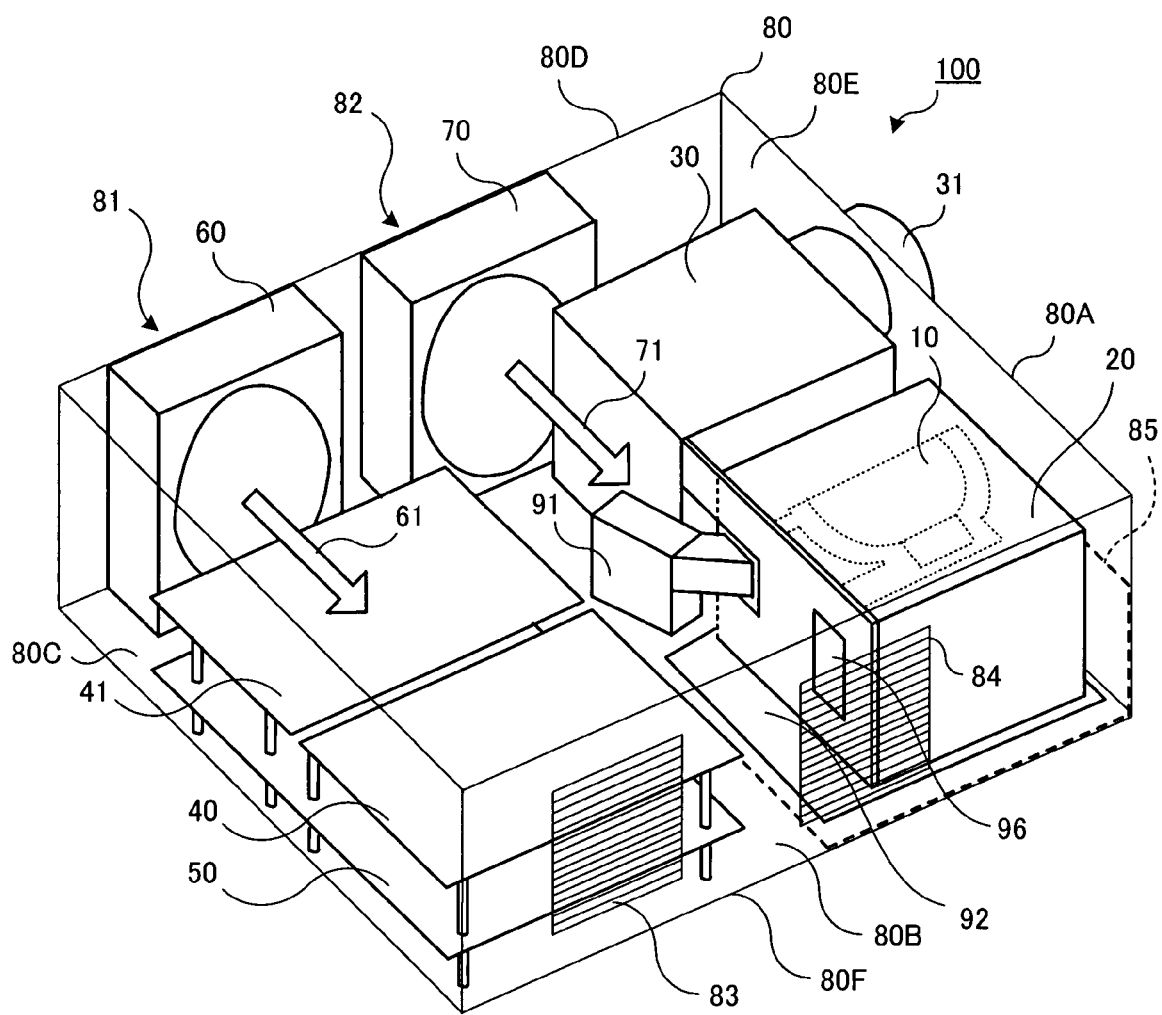
FIG. 2 is a perspective view schematically showing the internal construction of this projector according to an embodiment of the present invention.

FIG. 2 is a perspective view schematically showing the internal construction of this projector according to an embodiment of the present invention. This projector 100 comprises a lamp storage unit 20, an image projection unit 30, the projection lens 31, a power supply board 40, a power supply board 41, a control board 50, the intake apertures 81 and 82, the exhaust apertures 83 and 84, a metal plate 92, a main fan 60, and a main fan 70. Each of these is fitted to the projector main body 80.

The lamp storage unit 20 houses the lamp unit 10 in its interior. This lamp unit 10 comprises a lamp (not shown in the figures), which is a light source for image projection. The lamp unit 10 emits light from this lamp. And the lamp unit 10 is fixed to a lamp unit storage unit 20 by screws not shown in the figures.

The image projection unit 30 comprises an image display device such as a DMD or the like (not shown in the figures) and a color wheel (not shown in the figures either). This image projection unit 30 projects an image which is formed upon the image display device from the projection lens 31 to the exterior of the projector main body 80 by using light emitted from the lamp unit 10. By doing this, the image projection unit 30 projects this image upon a screen hanging upon a wall, or the like.

The power supply boards 40 and 41 supply power to the lamp unit 10 and so on. And the control board 50 controls the operation of the color wheel and the image display device and so on, not shown in the figures, which are provided to the image projection unit 30.

The main fans 60 and 70 are propeller fans. These main fans 60 and 70 are fans for ventilation of the interior of the projector main body 80. And the main fans 60 and 70 are fitted to the intake apertures 81 and 82. These main fans 60 and 70 take in external air from the intake apertures 81 and 82, and exhaust it from the exhaust apertures 83 and 84. By doing this, they air cool the interior of the main body of the projector 100.

It should be understood that, in FIG. 2, the direction of flow of the air blown by the main fans 60 and 70 is shown by the white arrows 61 and 71.

Furthermore, the projector 100 comprises an intake fan 91 and an exhaust aperture 96 for air cooling the lamp unit 10. The intake fan 91 cools the lamp provided within the lamp unit 10 by sucking in air which has been introduced into the interior of the projector main body by the main fans 60 and 70. And the air which is discharged from the exhaust aperture 96 is then discharged to the exterior of the main body by the main fans 60 and 70.

It should be understood that, in this embodiment, the state in which the lamp door 85 has been taken off, the bottom surface and the side surface of the projector main body 80 are opened wide (refer to FIGS. 1 and 2). However, it is not necessary to provide such a large opening portion; it is only necessary to provide an opening portion which is sufficiently large for it to be possible to exchange the lamp unit 10 during operation.

Now, due to emission of heat for image projection by the lamp, the lamp unit 10 attains an extremely high temperature. Moreover, the lamp door 85 faces the bottom surface of the lamp unit 10. In this projector 100, the lamp is cooled by the intake fan 91 for air cooling the lamp unit 10. However, this cooling is provided for keeping the lamp at a constant temperature. Due to this, the fact that the lamp unit 10 attains a high temperature does not change. And, due to this, the lamp door 85 is subjected to a high thermal load by emission of heat from the lamp unit 10.

Thus, in this embodiment, a metal plate 92 is fitted between the projector main body 80 and the lamp unit 10. In concrete terms, the structure is as follows.

Figure 3:
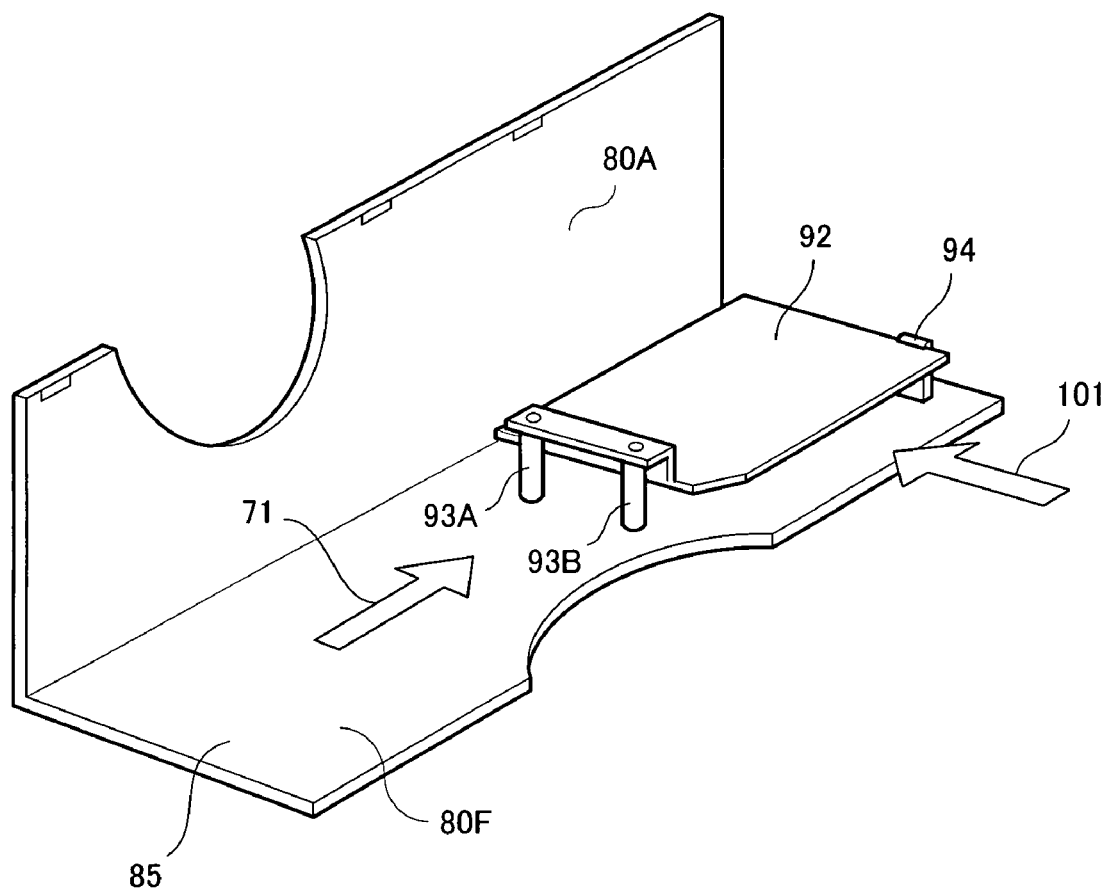
FIG. 3 is a general perspective view showing the appearance of a metal plate fixed to a lamp door of this projector according to an embodiment of the present invention.
Figure 4:
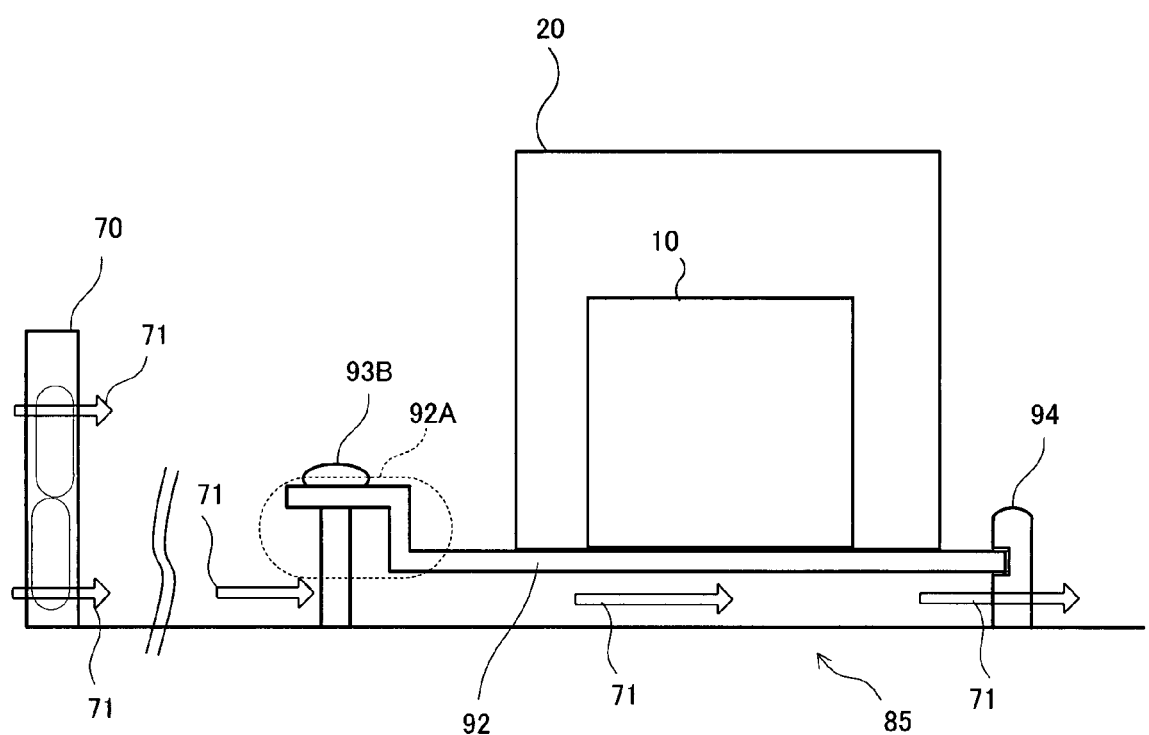
FIG. 4 is a side sectional view showing this metal plate and lamp door of the projector according to an embodiment of the present invention, as seen from the direction shown by the arrow sign 101 in FIG. 3.

FIG. 3 is a figure showing the appearance of this metal plate 92 fitted to the lamp door 85, in this projector which is an embodiment of the present invention. And FIG. 4 is a side sectional view showing this metal plate 92 and lamp door 85 of this projector which is an embodiment of the present invention, as seen from the direction shown by the arrow sign 101 in FIG. 3. Here, FIG. 3 shows the general appearance before the lamp door 85 has been fitted to the projector main body 80. And FIG. 4 shows the general appearance after the lamp door 85 has been fitted to the projector main body 80.

As shown in FIGS. 3 and 4, the metal plate 92 is fitted in a state as floating above the bottom surface of the lamp door 85. In other words, the metal plate 92 is positioned with a certain gap being maintained between itself and the bottom surface of the lamp door 85. In order to establish this state, the metal plate 92 is fitted to the lamp door 85 by bosses 93A, 93B and a support portion 94. In concrete terms, one end portion 92A of the support plate 92 is fixed by these bosses 93A and 93B, while the other end portion thereof is engaged into the support portion 94. Furthermore, the main fan 70 is disposed in such an orientation as to blow the air which has been sucked in from outside towards this metal plate 92.

The metal plate 92 is provided between the lamp unit 10 and the lamp door 85 (refer to FIGS. 2 and 4). And the metal plate 92 intercepts heat emitted from the lamp unit 10. In other words, the metal plate 92 prevents the heat emitted from the lamp unit 10 from being transmitted to the lamp door 85. Furthermore, the air flow 71 which is sucked in by the main fan 70 cools the lamp unit 10 and the metal plate 92. Moreover, the air flow 71 which flows in the gap between the metal plate 92 and the bottom surface of the lamp door 85 cools the metal plate 92 and the bottom surface of the lamp door 85.

Yet further, if the metal plate 92 and the lamp door 85 should come into mutual contact, then the lamp door 85 would be subjected to heat from this contact spot. Accordingly, in order to prevent the lamp door 85 from being heated up in this manner, the metal plate 92 is positioned with a certain gap being left between it and the bottom surface of the lamp door 85. Moreover, in order to reduce the spots where heat is transmitted from the metal plate 92, the bosses 93A, 93B are fixed by screws to a portion of the metal plate 92, and a portion of the metal plate 92 is sandwiched by the support portion 94. Furthermore, since the bosses 93A, 93B are contacted with the lamp door 85, accordingly it is desirable, as shown in FIGS. 3 and 4, for them to be disposed at spots on the upstream side of the air flow 71, in other words at spots where the air flow 71 is comparatively cool.

By the above, it is possible to reduce the thermal load which is imposed upon the lamp door 85 from the lamp unit 10. In other words, it is possible to prevent the occurrence of the state of affairs, that the lamp door 85 is not able to withstand this thermal load, and softens or melts. Accordingly, it is possible to anticipate enhancement of the reliability of the device main body 100.

It should be understood that although, in this embodiment, the lamp unit 10 is contacted against the metal plate 92, this is not essential; it would also be possible for the lamp unit 10 and the metal plate 92 not to be in mutual contact, but for a structure to be employed in which a space is provided between the lamp unit 10 and the metal plate 92, with this space being vented.

The following variants of this embodiment of the present invention may also be employed.

A First Variant Embodiment

Figure 5:
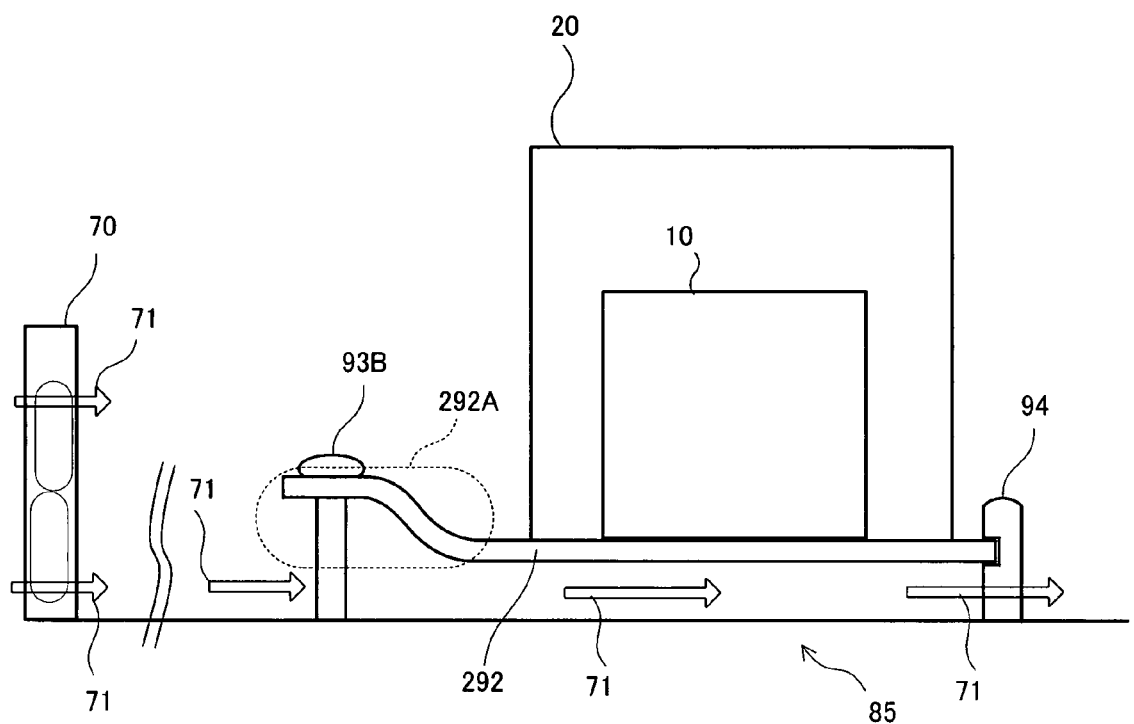
FIG. 5 is a side sectional view showing a metal plate and a lamp door of a projector according to a first variant embodiment of the present invention, as seen from the direction shown by the arrow sign 101 in FIG. 3.

FIG. 5 is a side sectional view showing a metal plate and a lamp door of a projector according to a first variant embodiment of the present invention, as seen from the direction shown by the arrow sign 101 in FIG. 3. This metal plate 292 has a sloping portion 292A on the upstream side of the air flow 71, which slopes toward the inner surface of the projector main body bottom plate 80F, taking the direction of this air flow as a reference. In other words, in this first variant embodiment, the metal plate 292 has a shape in which its end portion 292A towards the side of the fan 70 is curved upwards. Due to this formation of the metal plate 292, it is possible for the air flow 71 to be sucked into the gap between the metal plate 292 and the bottom surface of the lamp door 85 in large volume. Moreover, since this sloping portion 292A is positioned at its upstream side with respect to the air flow 71, accordingly it is possible for the air flow 71 to be sucked in while it is comparatively cool. And thus the air flow which flows through this gap between the metal plate 292 and the bottom surface of the lamp door 85 is able to cool the metal plate 292 and the bottom surface of the lamp door 85.

Furthermore although, in the structure shown in FIG. 4 as well, the metal plate 92 is positioned so that the air flow 71 is sucked into this gap, here, the air flow 71 experiences resistance due to the end portion 92A of the metal plate 92. However since, with the structure shown in FIG. 5, the end portion 292A of the metal plate 292 is provided as sloping, accordingly the air flow 71 experiences almost no resistance. Due to this, the metal plate 292 is cooled by the air flow 71 with good efficiency.

According to the above structure, it is possible to reduce the thermal load which is imposed upon the lamp door 85 by the lamp unit 10 by yet a further level.

The sloping portion 292A corresponds to the "fan side end portion" of the Claims.

A Second Variant Embodiment

Figure 6:
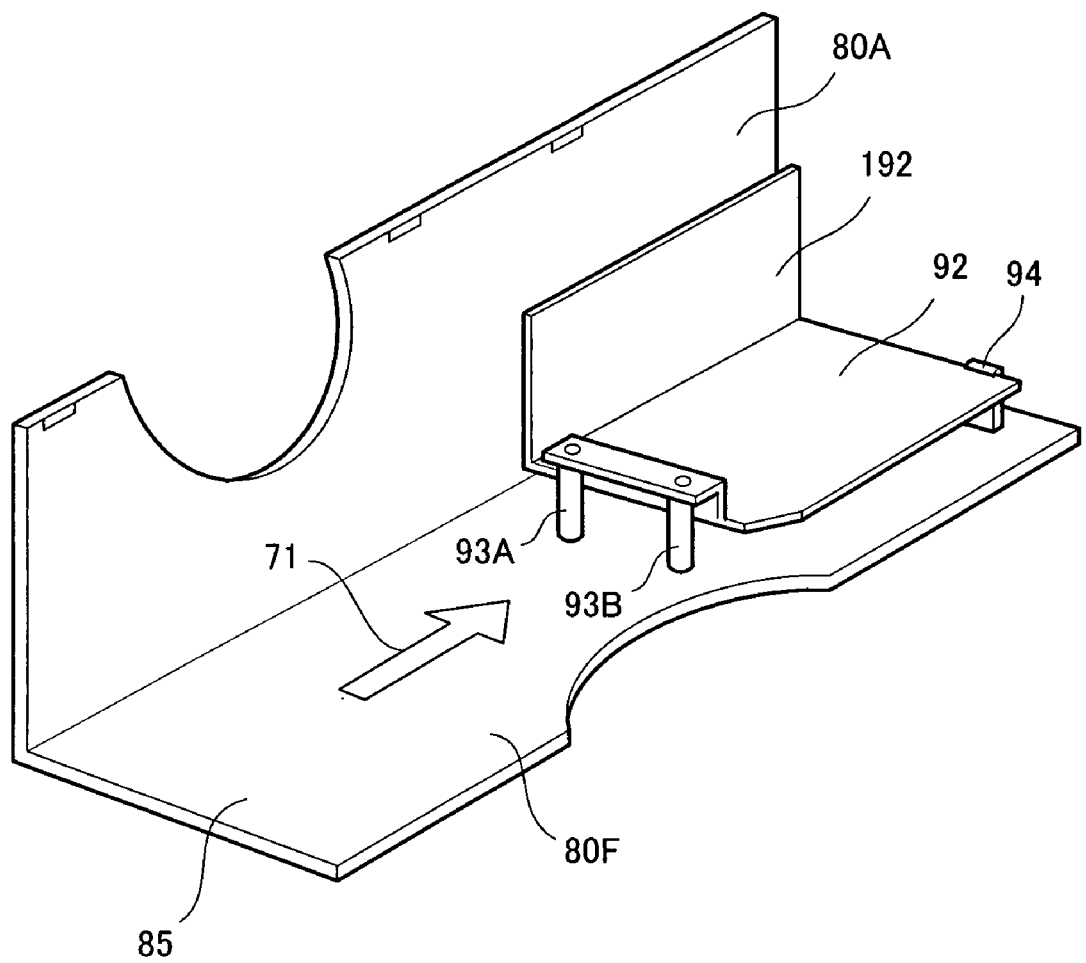
FIG. 6 is a general perspective view showing the appearance of a metal plate fixed to a lamp door of a projector according to a second variant embodiment of the present invention.

FIG. 6 is a figure showing the general appearance of a metal plate fixed to a lamp door of a projector according to a second variant embodiment of the present invention.

The heat which is emitted by the lamp unit 10 is not diffused only directly downwards in the lamp unit 10, but is also diffused radially. In particular, it has become clear from experiments that the thermal load due to the lamp unit 10 upon the inner side of the side plate 80A (the lamp door 85) of the projector main body 80 in the vicinity of the lamp unit 10 is relatively large.

Accordingly, as shown in FIG. 6, a portion 192 of the metal plate 92 is located between the side plate 80A (the lamp door 85) of the projector main body 80 and the lamp unit 10. Furthermore, this metal plate 92 is fitted in a state of floating above the bottom plate 80F of the projector main body 80 and also floating away from its side plate 80A. In other words, the metal plate 92 is disposed with gaps being left between itself and the bottom plate 80F, and also between itself and the side plate 80A.

According to the above, it is possible to reduce the thermal load which is imparted from the lamp unit 10 to the side plate 80A (the lamp door 85). In other words, it is possible to prevent the occurrence of the state of affairs that the side plate 80A (the lamp door 85) is not able to withstand this thermal load, and softens or melts.

What is claimed is:

1. A projector, comprising:
    a lamp unit, comprising a lamp which emits light for projecting an image upon a screen, and provided with a projector main body;
    a metal plate which is disposed, between a bottom surface of said projector main body and said lamp unit, in a situation of floating away from said bottom surface of said projector main body; and
    a fan which sucks external air into said projector main body, and which is disposed in an orientation such as to blow said sucked in external air towards said metal plate.

2. A projector as described in claim 1, wherein said metal plate has a shape in which its end portion towards said fan is curved upwards.

3. A projector as described in claim 1, wherein a portion of said metal plate is disposed, between a side surface of said projector main body and said lamp unit, in a situation of floating away from said side surface of said projector main body.

* * * * *